United States Patent
Yang

(10) Patent No.: US 6,743,035 B1
(45) Date of Patent: Jun. 1, 2004

(54) ELECTRONIC CARD CONNECTOR

(75) Inventor: Hui-Ping Yang, Pingtung Hsien (TW)

(73) Assignee: Speed Tech Corp, Kwei-Shan Hsiang (TW)

( * ) Notice: Subject to any disclaimer, the term of this patent is extended or adjusted under 35 U.S.C. 154(b) by 0 days.

(21) Appl. No.: 10/692,676

(22) Filed: Oct. 27, 2003

(51) Int. Cl.⁷ .............................................. H01R 13/62
(52) U.S. Cl. ...................................... 439/326; 439/630
(58) Field of Search ................................ 439/326, 630, 439/331

(56) References Cited

U.S. PATENT DOCUMENTS

| | | | |
|---|---|---|---|
| 6,106,317 A | * | 8/2000 | Michaelis et al. .......... 439/326 |
| 6,149,466 A | * | 11/2000 | Bricaud et al. ............. 439/630 |
| 6,174,188 B1 | * | 1/2001 | Martucci .................... 439/326 |
| 6,210,193 B1 | * | 4/2001 | Ito et al. .................... 439/326 |
| 6,220,882 B1 | * | 4/2001 | Simmel et al. ............. 439/326 |
| 6,241,545 B1 | * | 6/2001 | Bricaud et al. ............. 439/326 |
| 6,468,101 B2 | * | 10/2002 | Suzuki ........................ 439/326 |
| 6,471,550 B2 | * | 10/2002 | Maiterth et al. ............ 439/631 |

* cited by examiner

Primary Examiner—Gary Paumen
(74) Attorney, Agent, or Firm—Bacon & Thomas, PLLC

(57) ABSTRACT

An electronic card connector is described. The electronic card connector has a base and an upper lid. The base has a plurality of conductive terminals for transmitting/retrieving data signals for reading/retrieving data. The base has axles formed on distal ends of two sides thereof and protruded blocks on said two sides thereof. The upper lid has suspended arms positioned on the distal end of two sides of the upper lid and rotatably connects to the axles. The upper lid has buckling plates corresponding to the protruded blocks, and each of the suspended arms has a protrusion on a surface thereof. A track is formed on the axles of the base such that when the upper lid open or close, the axle of base allows the upper lid to rotate in an appropriate range to prevent damages to said electronic card connector.

3 Claims, 5 Drawing Sheets

ELECTRONIC CARD CONNECTOR

BACKGROUND OF THE INVENTION

1. The Field of the Invention

The present invention generally relates to an electronic card connector, and more particularly to an electronic card connector comprising an upper lid that can be opened or closed by rotating the upper lid along an axis at one end or sliding the upper lid.

2. Description of the Related Art

Nowadays, in a well-developed information technology era, the cellular phone has become one of the most popular and essential communication tools for users. Along with the increased numbers of the cellular phones, there also exist a variety of types and styles of the cellular phones with improved functionalities. From the first generation of the cellular phone to the latest model, the trend of smallness, lightness, flatness, portability and good reception continues. Sometimes, a user may need more than one cellular phone due to different usage conditions, for example, different frequency for different countries. Therefore, the cellular phones are designed in various models and styles to meet the users' requirement. When the user needs to switch the cellular phone into another cellular with the same number, the user has to remove the SIM electronic card from the phone and fit into the electronic card connector of the other cellular phone.

Referring to FIG. 6, a side view of a conventional electronic card connector is shown, wherein the electronic card connector comprises a base A and an upper lid B. The base A comprises an axle A1 at the two distal ends, and at the two sides of the base A have a plurality of protrusions A2. The protrusion A2 has buckling groove A21 at a bottom thereof. Bent suspended arms B1 extend downwardly at the two sides of the upper lid B and passing around the axles A1. The bent suspended arms B1 are capable of rotating along the axels A1 for opening or closing the upper lid B. On the two sides of the upper lid B comprise buckling plates B2 corresponding to the buckling grooves A21. However, there is no fixed positioning arrangement for the bent suspended arms B1 to rotate along the axles A1, thus the upper lid B may rotate or move along any position of the bent suspended arms B1 misaligning the buckling plate B2 of the upper lid B and fall on the top face of the protrusion A2 of the base A, in such occasion, any external force applied on the upper lid B can easily cause deformation of the shape of the buckling plate B2.

Because the conventional design can easily misalign the buckling plate B2 of the upper lid B making it difficult to fit into the buckling groove A21 formed on the side of the protrusion A2 of the base A for positioning. Further, a long-term usage under this condition, the buckling plate B2 will be deformed or damaged and thereby damaging the upper lid B. Therefore, to find a way to improve the above defects is a very important issue for the manufacturer in the field.

SUMMARY OF THE INVENTION

Accordingly, in the view of the foregoing, the present inventor makes a detailed study of related art to evaluate and consider, and uses years of accumulated experience in this field, and through several experiments, to create a new electronic card connector. The present invention provides an innovated, cost effective electronic card connector.

According to an aspect of the present invention, the electronic card connector comprises a protrusion formed on the suspended arm to rotate corresponding to the base, thus the upper lid is able to rotate in a fine range to prevent damages to the electronic card connector from occurring.

BRIEF DESCRIPTION OF THE DRAWING

For a more complete understanding of the present invention, reference will now be made to the following detailed description of preferred embodiments taken in conjunction with the accompanying drawings.

DETAILED DESCRIPTION OF PREFERRED EMBODIMENTS

Figure 1:
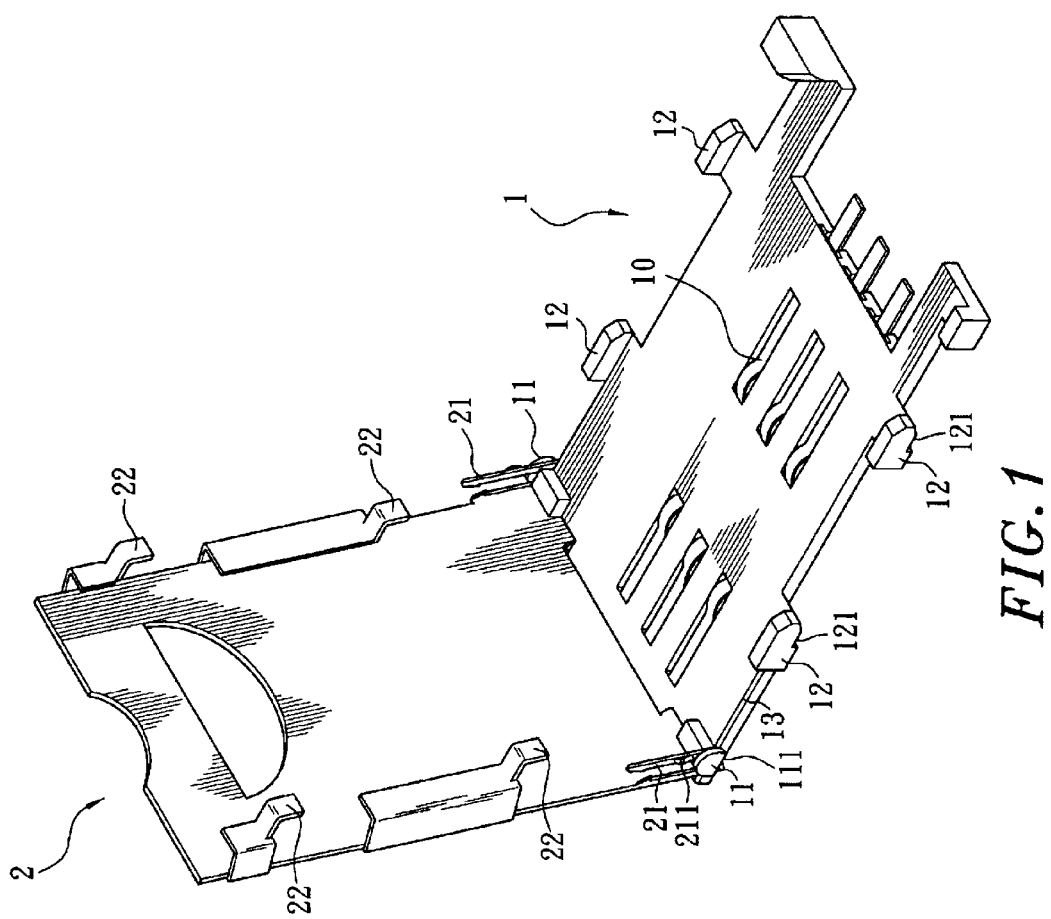
FIG. 1 is the elevational view of an electronic card connector of the present invention.
Figure 2:
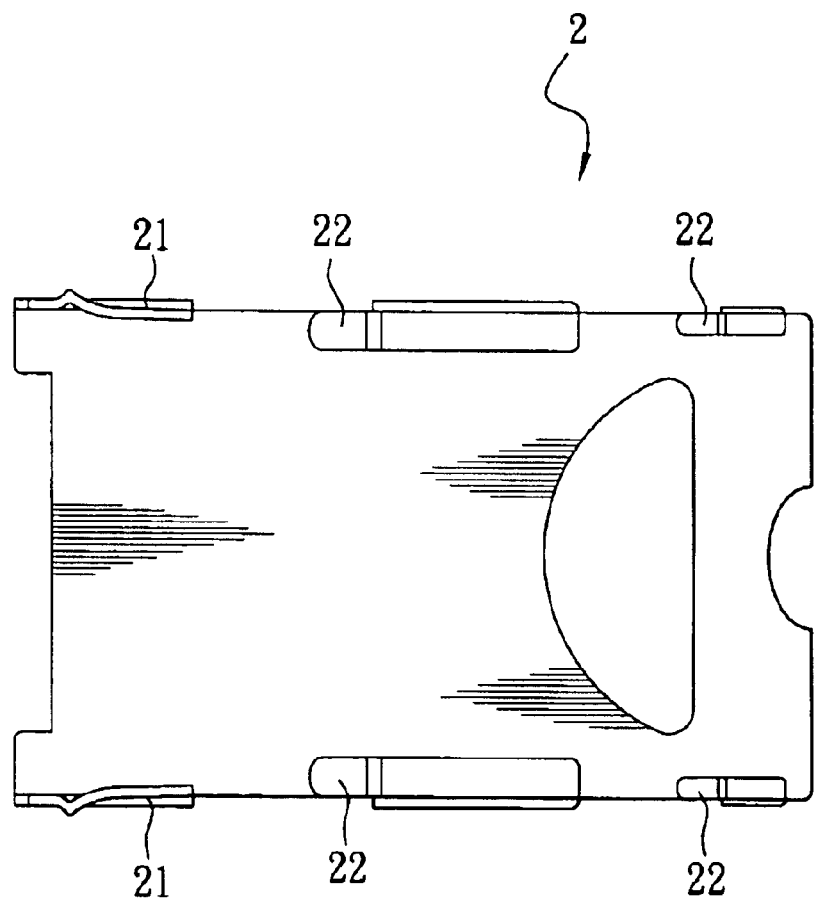
FIG. 2 is a top view of the electronic card connector of the present invention.

Reference will be made in detail to the preferred embodiments of the invention, examples of which are illustrated in the accompanying drawings. Wherever possible, the same reference numbers are used in the drawings and the description to refer to the same or like parts.

Referring to FIG. 1, the elevational view of the electronic card connector of the present invention is shown. The electronic card connector comprises a base 1 and an upper lid 2. The base 1 comprises a plurality of conductive terminals 10 for transmitting/retrieving signals for reading/retrieving data. The base 1 comprises two axles 11 positioned on two distal ends of two sides thereof. A plurality of protruded blocks 12 having buckling grooves 121 are positioned along two sides of the base 1 as shown in FIG. 1. The upper lid 2 comprises suspended arms 21 formed on the distal ends of two sides thereof, wherein the suspended arms 21 are bent into a U shape with the open end facing towards frontal part of the electronic card connector. The suspended arms 21 are positioned around the axles 11 capable of rotating along the axels 11 as an axis. The suspended arms 21 comprises buckling plates 22 on two sides thereof, wherein the buckling plates 22 are positioned corresponding to the buckling groove 121. The suspended arms 21 formed on the two sides of the upper lid 2 comprise a protrusion 211 formed on a surface thereof. An indentation 13 is formed on the base 1 such that the indentation 13 is positioned corresponding to the suspended arm 21. A track 111 is formed at a bottom part of the axle 11 that correspond to the protrusion 211.

Figure 3:
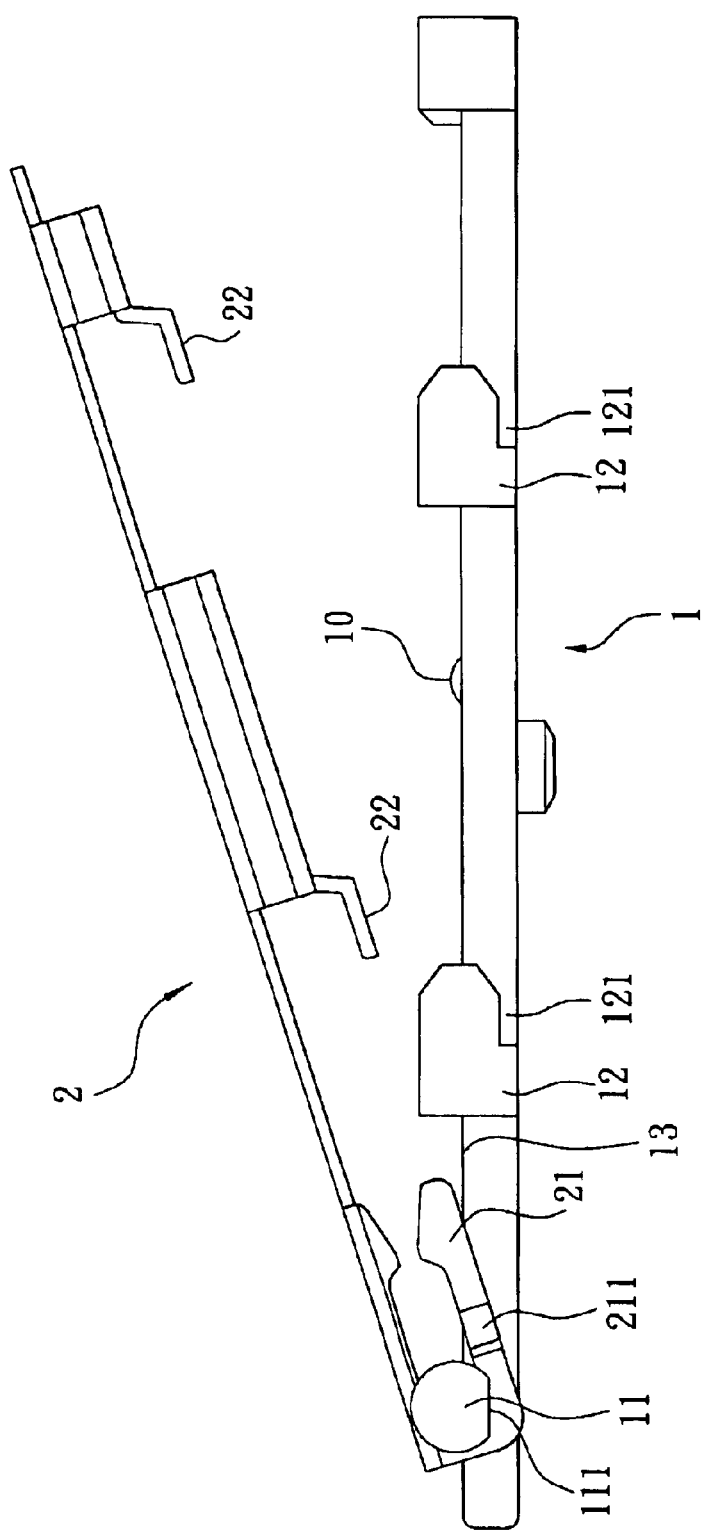
FIG. 3 is a side view of the electronic card connector of the present invention with the upper lid opened.
Figure 4:
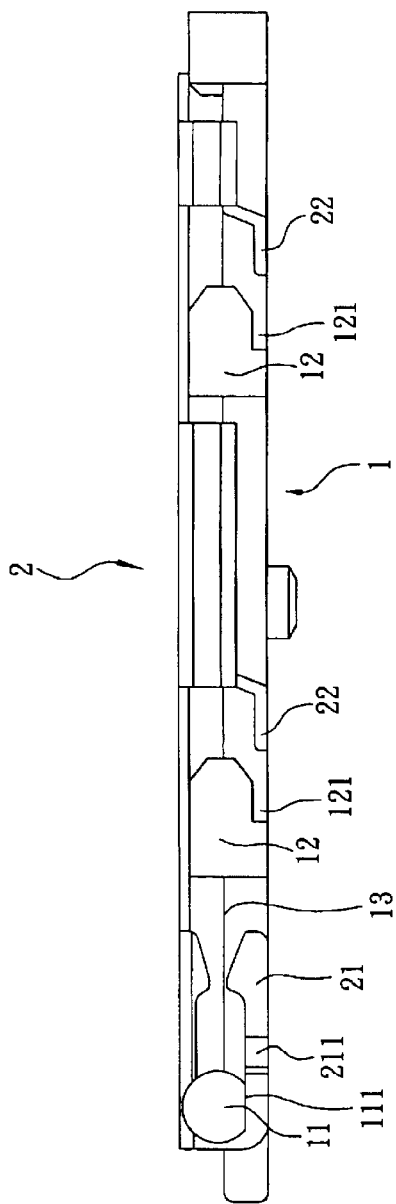
FIG. 4 is a side view of the electronic card connector of the present invention while the upper lid is closing.
Figure 5:
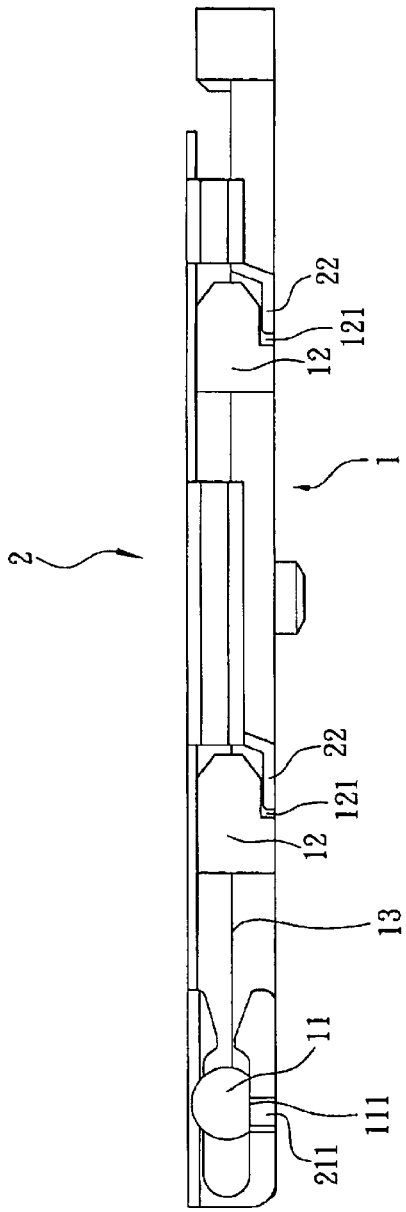
FIG. 5 is a side view of the electronic card connector of the present invention with the upper lid closed.
Figure 6:
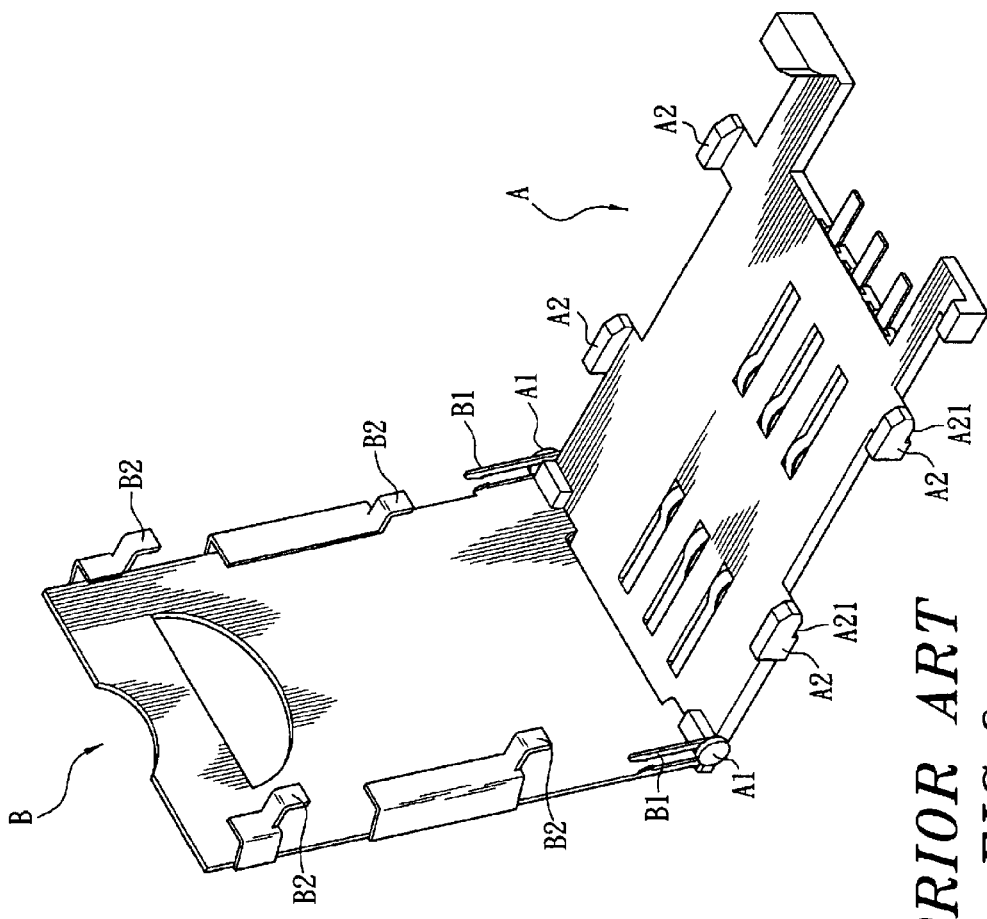
FIG. 6 is a side view of a conventional electronic card connector.

Referring to FIGS. 3, 4 and 5, respectively show the side view of the electronic card connector of the present invention with the upper lid opened, the side view of the electronic card connector of the present invention while the upper lid is closing, and the side view of the electronic card connector of the present invention with the upper lid closed. When the upper lid 2 opens, the position of the protrusion 211 allows the upper lid 2 to rotate along the axle 11 of the base 1, and as the upper lid 2 reaches a certain position during the closing action, the protrusion 211 will have a freedom to move along a horizontal direction along the track 111, and therefore the buckling plates 22 of the upper lid 2 can buckle into the buckling groove 121 of the protruded blocks 12 formed on the two sides of the base 1 for proper positioning. The design of the track 111 is to secure the upper lid 2. When the upper lid 2 is secured, the protrusion 211 is supported on the lower portion of the track 111 to prevent the upper lid 2 from opening in an inappropriate position so that damages of due to any external force can be effectively prevented.

The suspended arms 21 is designed with a inclined angle in a manner to increase the internal strength of the suspended arm 21 for allowing the protrusion 211 to be steadily supported at the axle 11. Accordingly, even after a long-term usage of the suspended arm 21 of the upper lid 2, the positioning of the upper lid 2 with respect to the axels 11 will remain steady. Besides, the indention 13 is formed in the base 1 corresponding to the suspended arm 21 will allow the upper lid 2 to close more smoothly, and the suspended arms 21 will hold on to the side with the inner portion to prevent the upper lid 2 from shaking.

In the preferred embodiment of the present invention, the axle 11 of the base 1 comprises the track 111 to allow the protrusion 211 of the suspended arm 21 to move in an appropriate position, and the position or shape of the track 111 can be designed according to the practical need, and the figures thereof is only for the purpose of demonstrating the preferred embodiment and not to restrict the scope of the present invention.

According to an aspect of the present invention, the strength of the buckling plate 22 of the upper lid 2 is smaller than the protruded blocks 12 of the base 1, so that the buckle plate 22 of the upper lid 2 may have certain degree of transfiguring.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations in which fall within the spirit and scope of the included claims. All matters set forth herein or shown in the accompanying drawings are to be interpreted in an illustrative and non-limiting sense.

What is claimed is:

1. An electronic card connector, comprising:

a base, having a plurality of conductive terminals for transmitting/retrieving data signals for reading/retrieving data, wherein said base comprises axles formed on distal ends of two sides thereof and protruded blocks on said two sides thereof; and an upper lid, having suspended arms positioned on the distal end of two sides of the upper lid, rotatably connecting to said axles, wherein said upper lid comprises buckling plates corresponding to said protruded blocks, and each of said suspended arms comprises a protrusion on a surface thereof, and wherein a track is formed on each said axle of said base such that when said upper lid is in opening or closing status, said axle of said base allows said upper lid to rotate in an appropriate range to prevent damage to said electronic card connector.

2. The electronic card connector according to claim 1, wherein said plurality of protruded blocks formed on two sides of said base have buckling grooves.

3. An electronic card connector according to claim 1, wherein each said suspended arm is bent inwardly with an inclined angle, and said base has a indention corresponding to each said suspended arm.

* * * * *